United States Patent [19]

Dunn

[11] 4,204,599

[45] May 27, 1980

[54] EDUCATIONAL KIT FOR SOLIDIFICATION OF A CHEMICAL COMPOUND TO PRODUCE CRYSTAL GROWTH

[75] Inventor: Burton D. Dunn, Phoenix, Ariz.

[73] Assignee: Lava Gardens, Inc., Phoenix, Ariz.

[21] Appl. No.: 951,574

[22] Filed: Oct. 16, 1978

[51] Int. Cl.² .................... B44D 5/00; G09B 19/00
[52] U.S. Cl. .................................. 206/575; 35/18 R; 35/26; 206/461; 428/13
[58] Field of Search .......... 35/18 R, 26; 206/45.33, 206/45.34, 470, 461, 1.7, 1.8, 223, 575, 577, 579; 428/13

[56] References Cited

U.S. PATENT DOCUMENTS

| | | | |
|---|---|---|---|
| 2,128,760 | 8/1938 | Shapiro | 428/13 X |
| 2,540,432 | 2/1951 | Evans | 206/579 X |
| 3,029,936 | 4/1962 | Graber | 206/575 |
| 3,287,193 | 11/1966 | Klein | 35/26 X |
| 3,581,882 | 6/1971 | Bish | 206/1.7 |
| 4,022,318 | 5/1977 | Goodman | 206/223 |

*Primary Examiner*—Harland S. Skogquist
*Attorney, Agent, or Firm*—Warren F. B. Lindsley

[57] ABSTRACT

An educational kit for solidification of at least one chemical compound on lava rock particles supported on an irregularly shaped base to produce crystal growth simulating a garden or crystal mountain forest.

7 Claims, 4 Drawing Figures

U.S. Patent May 27, 1980 4,204,599
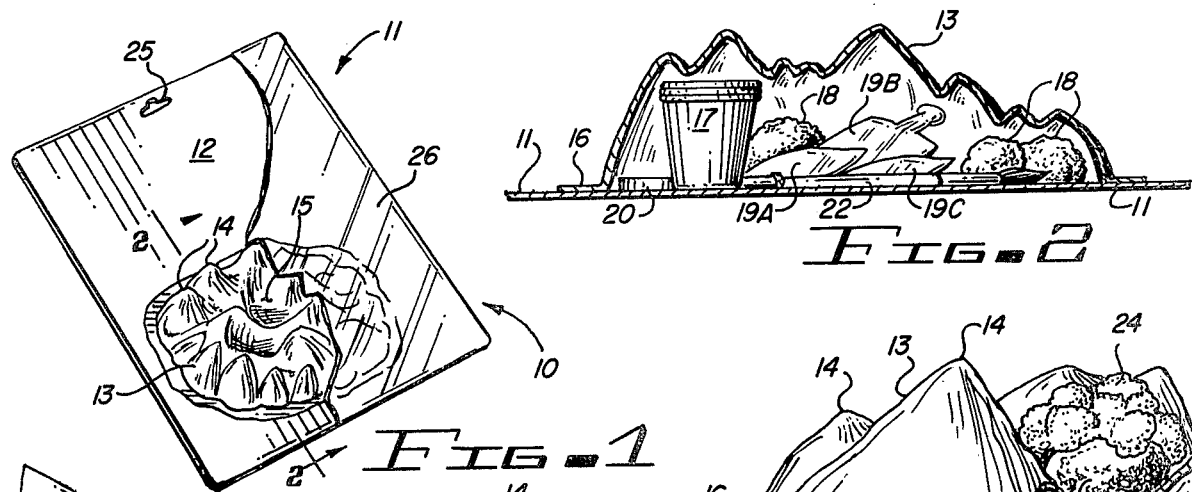
FIG-1
FIG-2
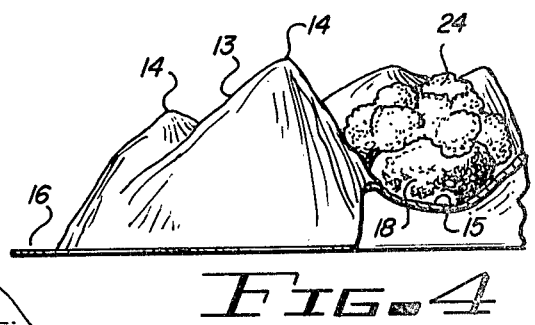
FIG-4
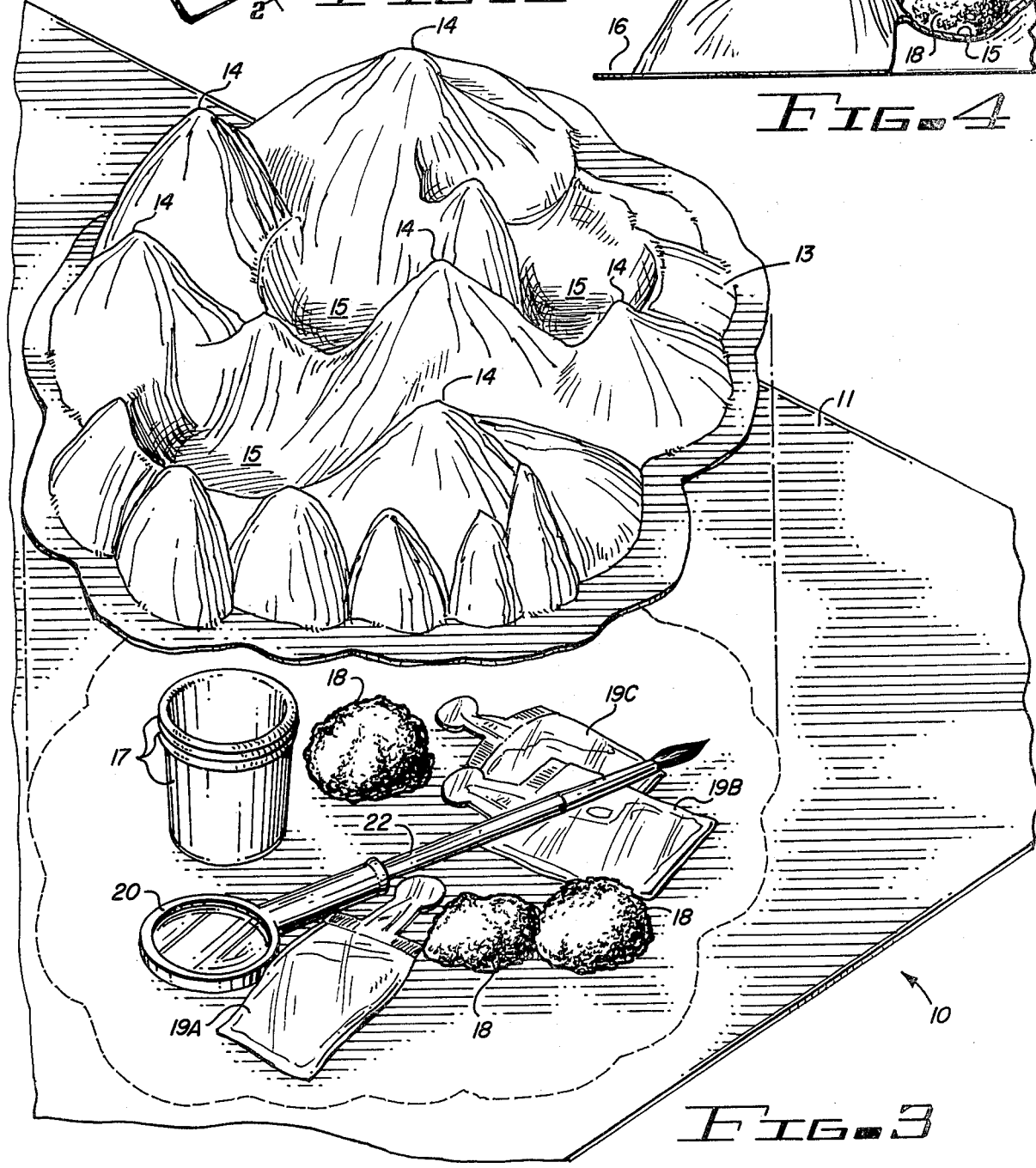
FIG-3

EDUCATIONAL KIT FOR SOLIDIFICATION OF A CHEMICAL COMPOUND TO PRODUCE CRYSTAL GROWTH

BACKGROUND OF THE INVENTION

Although some differences between the shapes of crystals of different substances have been noticed by many people in their every day life, the symmetry of repetition of crystal angles and faces have not been noted by the average individual. Also different views have been held as to the causes of crystallization.

None of the studies previously made on crystal growth and materials written thereon have resulted in an educational kit intended to increase the awareness of crystal growth to the novice and at the same time providing a colorful display of crystal growth which may be grown or formulated in a particular way to simulate a colorful garden or crystal forest.

SUMMARY OF THE INVENTION

In accordance with the invention claimed, a new and improved educational kit has been provided for the solidification of a chemical compound to produce crystal growth in a controlled manner.

It is, therefore, one object of this invention to provide a new and improved educational product which when used solidifies a chemical solution to produce crystal growth.

Another object of this invention is to provide a new and improved educational kit which provides the necessary ingredients, implements and instructions to produce multi-colored crystal growth on lava rock placed in a simulated mountain base support to create a varied colored crystal display.

A further object of this invention is to provide an educational kit which provides the means for creating a simulated mountain display of spaced lava rocks coated with colored crystals.

A still further object of this invention is to provide an educational kit which can be used to create a crystal growth display which may be stimulated or regenerated to continue to crystalize beyond its previous state.

Further objects and advantages of this invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of an educational kit mounted on a display board;

FIG. 2 is a cross-sectional view of FIG. 1 taken along the line 2—2;

FIG. 3 is an enlarged partial exploded view of the kit shown in FIG. 1; and

FIG. 4 is a partial perspective view of the kit cover forming a display support for the lava rocks covered with the crystal display.

DESCRIPTION OF THE PREFERRED EMBODIMENT

Referring more particularly to the drawing by characters of reference, FIGS. 1-4 disclose an educational kit 10 comprising a display board 11 which may contain instructions and educational comments on one or more sides thereof. The display board supports on its front side 12 thereof a hollow irregularly shaped molded bubble or support 13 which is intended to simulate a mountain range with its peaks 14 and valleys 15. This support is provided with a laterally extending flange 16 around its periphery which is coplanar with the flat surface 12 of the display board. Accordingly, if a suitable adhesive is placed on part or all of the underside of the flange when it is placed on the flat surface 12 of the display board, the support will adhere to surface 12 of the display board and remains thereon until the kit is used for growing crystals at which time it will be removed from the dispaly board.

As shown in FIGS. 2 and 3, the hollow interior of support 13 is intended to cover and house until kit is opened, the tools and ingredients necessary to use the kit to grow crystals in a predetermined manner.

As shown in FIGS. 2 and 3, the kit may contain a pair of small paper cups 17, three pieces of suitable porous rock such as lava rocks 18, package material 19A, 19B and 19C which comprises a suitable chemical solution which when applied to the porous surface of the lava rocks will solidify under the effects of evaporation and thereby produce crystal growth of a color depending on the color of the dye used in the chemical solution. The kit further comprises a magnifying glass 20 having the shaft 21 of a pencil-like paint brush 22 extending out of its handle axially therewith. The free end of the paint brush is provided with bristles.

It should be noted that the hollow interior of support 13 with its peaks 14 and valleys 15 form pockets for the items 17–22 stored thereunder in such a manner that they can be maintained separate from each other. If desired, the support 13 may be formed of transparent plastic so that items 17–22 may be seen before unpacking.

Although the kit may be assembled and sold with the support 13 merely secured to the display board 11 and with the aperture 25 utilized to hold and support the kit and others like it from a display pin (not shown), it also should be noted that the display board 11 and support 13 may be covered with a shrink cover or wrapper 26 commonly used for covering small items.

Utilization of Kit

To utilize the kit for growing crystals, the shrink wrapper 26 is removed from the display board 11 and the support 13 detached therefrom by lifting the adhesively held flange 16 of support 11 from surface 12 of the display board.

The support 13 is then placed on a flat surface in a well ventilated place with flange 26 resting thereon. The lava rocks are then evenly displaced in valleys 15 between peaks 14 of the simulated mountain range formed by support 13.

The color packages 19A, 19B and 19C are then opened. As shown, these packages may comprise flasks the tops of which may be cut off to open the packages.

The contents of the packages are then gently poured over the exposed surfaces of the lava rocks, wetting all of the available surface. If desired, the paint brush 22 may be used to paint the rocks with the solution of the packages poured into cups 17. These packages may contain in solution any suitable evaporatable chemical compound which promotes labile crystallization.

One useable solution may be one containing ammonia and water forming a compound $NH_3H_2O$. To this may be added selected color vegetable dyes with each pacakge containing a different dye.

Within minutes the color crystals will start to grow due to the effects of evaporation. Using the magnifying glass 20, a close-up view of lava rocks may be obtained showing the crystals during their growth period.

Full growth of the crystals may take about two days in a dry climate with a somewhat longer time in a humid area because growth depends on the evaporation rate of the solution, in this case containing $NH_3H_2O$.

If it is desired to contain the growth of the crystals to a given area on the support 13 or lava rocks 18, the bristles 23 of the brush 22 may be dipped in tap water placed in one of the cups 17 and with the moistened tip gently brush the undesired crystal growth away from the unwanted areas. Crystals will dissolve in contact with water.

Regeneration or additional crystal growth may be obtained by gently dripping a limited amount of water on the crystal formations. The existing crystals will dissolve and fill the porous openings of the lava rocks. Within minutes after evaporation has taken place new crystal growth will start developing with altered color shading due to the dilution of the original dye content of the material of packages 19A, 19B and 19C.

If desired, the color content of the crystal growth can be varied by mixing various solutions together. For example, a few drops of the solution of one package mixed with the solution of another package already poured over given lava rocks will form a blending of colors.

Although but one embodiment of the invention has been illustrated and described, it will be apparent to those skilled in the art that various changes and modifications may be made therein without departing from the spirit of the invention or from the scope of the appended claims.

What is claimed is:

1. An educational kit for generating crystal growth comprising:
   a display board having at least one display face,
   a hollow irregularly shaped three-dimensional support,
   said support having a flange extending laterally from the perimeter of its hollow configuration,
   adhesive means for detachable adhering said support to said display face, and
   a plurality of items stored in the hollow configuration of said support,
   said items comprising a plurality of small porous rocks, at least one package of crystalizable chemical solution and a magnifying glass,
   whereby when the items are removed from under said support, the rocks placed on the top of said support when it rests with its flange on a flat horizontal surface, and the chemical solution poured on top of said rocks, crystal formations will occur the detail of which may be observed through the magnifying glass.

2. The educational kit set forth in claim 1 wherein: said porous rocks comprise lava rocks.

3. The educational kit set forth in claim 1 wherein: said irregularly shaped three dimensional support comprises a simulated mountain range.

4. The educational kit set forth in claim 1 wherein: said support is formed of a molded plastic material.

5. The educational kit set forth in claim 4 wherein: said plastic material is transparent.

6. The educational kit set forth in claim 1 wherein: said chemical solution comprises ammonia in water and a dye.

7. The educational kit set forth in claim 6 wherein: said dye comprises a vegetable dye.

* * * * *